United States Patent [19]

Lee

[11] Patent Number: 5,779,253
[45] Date of Patent: Jul. 14, 1998

[54] MOUNTING DEVICE FOR MOUNTING ADJUSTABLY A HANDLEBAR ON A HEAD TUBE OF A BICYCLE

[75] Inventor: Kun-Ho Lee, Taichung Hsien, Taiwan

[73] Assignee: Giant Manufacturing Co., Ltd., Taiwan

[21] Appl. No.: 709,194

[22] Filed: Aug. 23, 1996

[51] Int. Cl.$^6$ .................... B62K 21/18; B62K 21/24
[52] U.S. Cl. .................. 280/279; 74/551.3; 74/551.6
[58] Field of Search ............................. 280/279, 280, 280/287, 288.4, 281.1; 74/551.1, 551.3, 551.4, 551.6; D12/118, 111

[56] References Cited

U.S. PATENT DOCUMENTS

| | | | |
|---|---|---|---|
| 671,647 | 4/1901 | Field | 74/551.6 |
| 5,465,634 | 11/1995 | Chen | 74/551.3 |
| 5,509,328 | 4/1996 | Lai | 74/551.3 |
| 5,562,013 | 10/1996 | Kao | 74/551.3 |
| 5,678,458 | 10/1997 | Kao | 280/279 |

FOREIGN PATENT DOCUMENTS

| | | | |
|---|---|---|---|
| 370723 | 2/1907 | France | 74/551.1 |

*Primary Examiner*—Anne Marie Boehler
*Attorney, Agent, or Firm*—Harness, Dickey & Pierce, P.L.C.

[57] ABSTRACT

A mounting device is used to mount a handlebar on a head tube of a bicycle and includes a positioning member which is adapted to be mounted on the head tube and a holding member which includes complementary first and second holding arms. Each holding arm has a pivot end portion, a gripping end portion and an abutment face which extends between the pivot and gripping end portions. The pivot end portion of each of the holding arms is mounted pivotally on the positioning member. The gripping end portion of each of the holding arms is formed with a grip section with an axis that is parallel to an axis of the pivot hole. The grip sections of the holding arms are adapted to grip fittingly the handlebar therebetween. The abutment faces of the holding arms are complementary and are formed as twisted faces that abut against each other. A first fastener extends through the pivot end portion of each of the holding arms and the positioning member to mount the holding member onto the positioning member. A second fastener extends through the holding arms on one side of the grip section to secure the holding member on the handlebar.

5 Claims, 6 Drawing Sheets

MOUNTING DEVICE FOR MOUNTING ADJUSTABLY A HANDLEBAR ON A HEAD TUBE OF A BICYCLE

BACKGROUND OF THE INVENTION

1. Field of the Invention

The invention relates to a device for mounting a handlebar on a head tube of a bicycle, more particularly to a mounting device for mounting adjustably a handlebar on a head tube of a bicycle.

2. Description of the Related Art

A conventional bicycle includes a frame which has a vertically extending head tube, a handlebar, and a mounting device for mounting the handlebar onto the head tube. The mounting device includes a holding sleeve which is sleeved on the handlebar, and a mounting cylinder which extends from the holding sleeve and which is mounted to the head tube with the use of screw fasteners. Although the conventional mounting device can mount firmly the handlebar on the head tube, it does not permit adjustments in the height of the handlebar relative to the head tube so as to suit the physical characteristics of the rider, thereby preventing the rider from achieving a comfortable riding position.

FIG. 1 illustrates a conventional mounting device for mounting adjustably a handlebar 7 on a head tube 1 of a bicycle. The mounting device includes a tubular mounting member 2 which is sleeved around the head tube 1 and which is formed with an axially extending slit 2a. Two opposite pairs of jaw projections project outwardly and radially from the mounting member 2 on two sides of the slit 2a and are formed with screw holes 2b to permit the passage of screw fasteners 2c therethrough so as to secure the mounting member 2 firmly on the head tube 1. The mounting member 2 is further formed with a spaced pair of radially and outwardly projecting lugs 2d. The mounting device further includes a holding member 6 which has a sleeve portion 60 that is sleeved around the handlebar 7, and a stem portion 61 that extends between the lugs 2d. A fastener 3 has a shank 3a which is rectangular in cross section and which passes through a pair of clamping members 5, a pair of packing rings 4, the pair of lugs 2d and the stem portion 61 of the holding member 6 to mount the holding member 6 onto the mounting member 2. As such, when the fastener 3 is loosened, the holding member 6 can be turned relative to the mounting member 2 so as to adjust the height of the handlebar 7 relative to the head tube 1.

The drawbacks of the aforementioned conventional adjustable mounting device are as follows:

1. The mounting device employs a large number of components to mount adjustably the handlebar 7 onto the head tube 1, thereby inconveniencing installation of the mounting device.

2. When the screw fasteners 2c engage tightly the screw holes 2b in the mounting member 2, the lugs 2d on the mounting member 2 are stretched apart, thereby making it difficult to secure the holding member 6 tightly onto the lugs 2d with the use of the fastener 3.

3. The various accessories on the handlebar 7, such as the brake handle, must be removed before the handlebar 7 can be replaced, thereby resulting in inconvenience to the user.

SUMMARY OF THE INVENTION

The object of the present invention is to provide a mounting device for mounting adjustably a handlebar on a head tube of a bicycle without encountering any of the aforementioned drawbacks of the prior art.

Accordingly, the mounting device of the present invention is used when mounting a handlebar on a head tube of a bicycle and comprises a positioning member adapted to be mounted on the head tube, and a holding member including complementary first and second holding arms, each of which has a pivot end portion, a gripping end portion and an abutment face which extends between the pivot and gripping end portions. One of the pivot end portion of each of the holding arms and the positioning member is formed with a pivot hole, while the other one of the pivot end portion of each of the holding arms and the positioning member is formed with a pivot projection that is received in the pivot hole to mount pivotally the pivot end portion of each of the holding arms on the positioning member. The gripping end portion of each of the holding arms is formed with a grip section with an axis that is parallel to an axis of the pivot hole. The grip sections of the holding arms are adapted to grip fittingly the handlebar therebetween. The abutment faces of the holding arms are complementary and are formed as twisted faces that abut against each other. A first fastener extends through the pivot end portion of each of the holding arms and the positioning member to mount the holding member onto the positioning member. A second fastener extends through the holding arms on one side of the grip section to secure the holding member on the handlebar.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
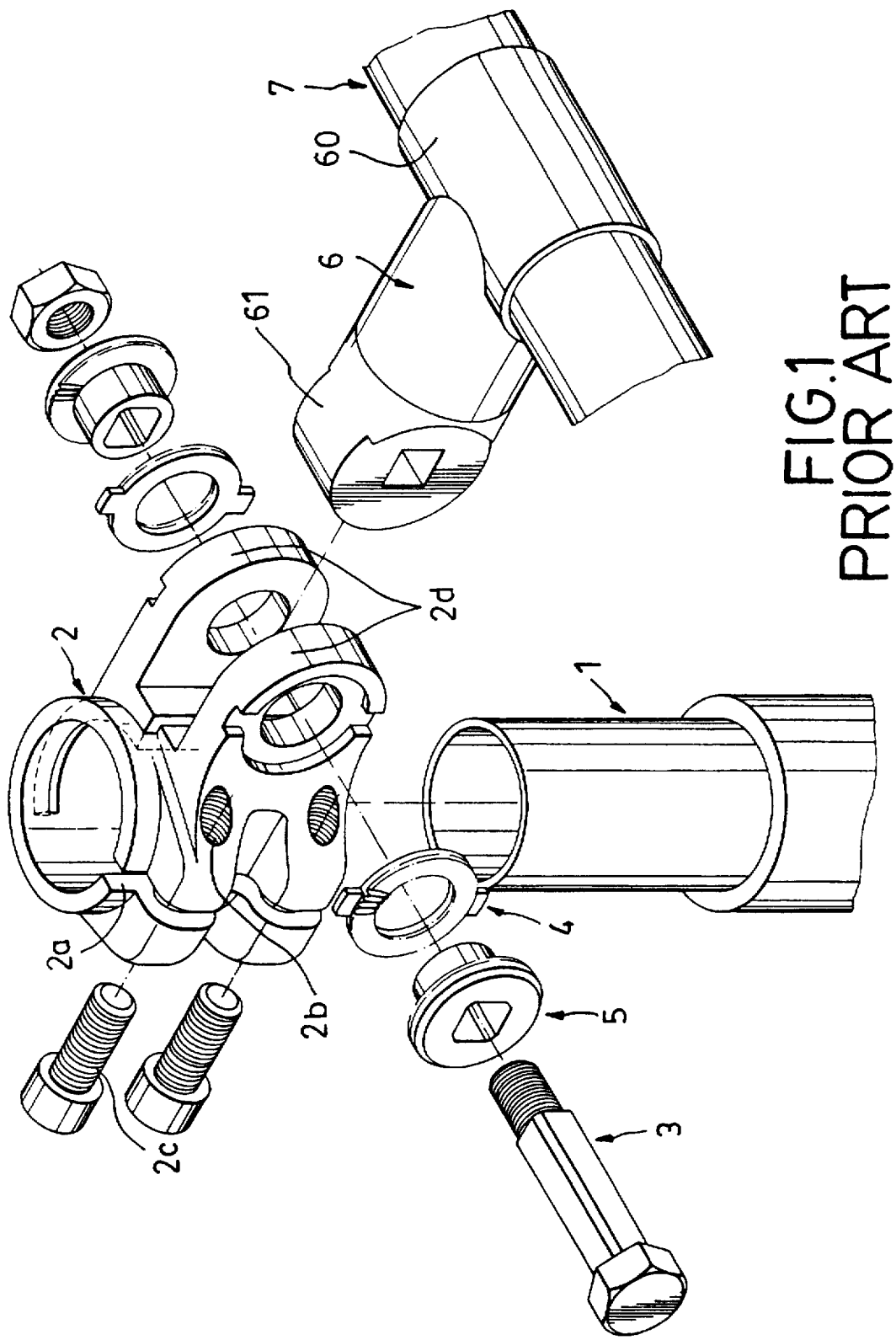
FIG. 1 is an exploded view of a conventional mounting device for mounting adjustably a handlebar on a head tube of a bicycle.
Figure 2:
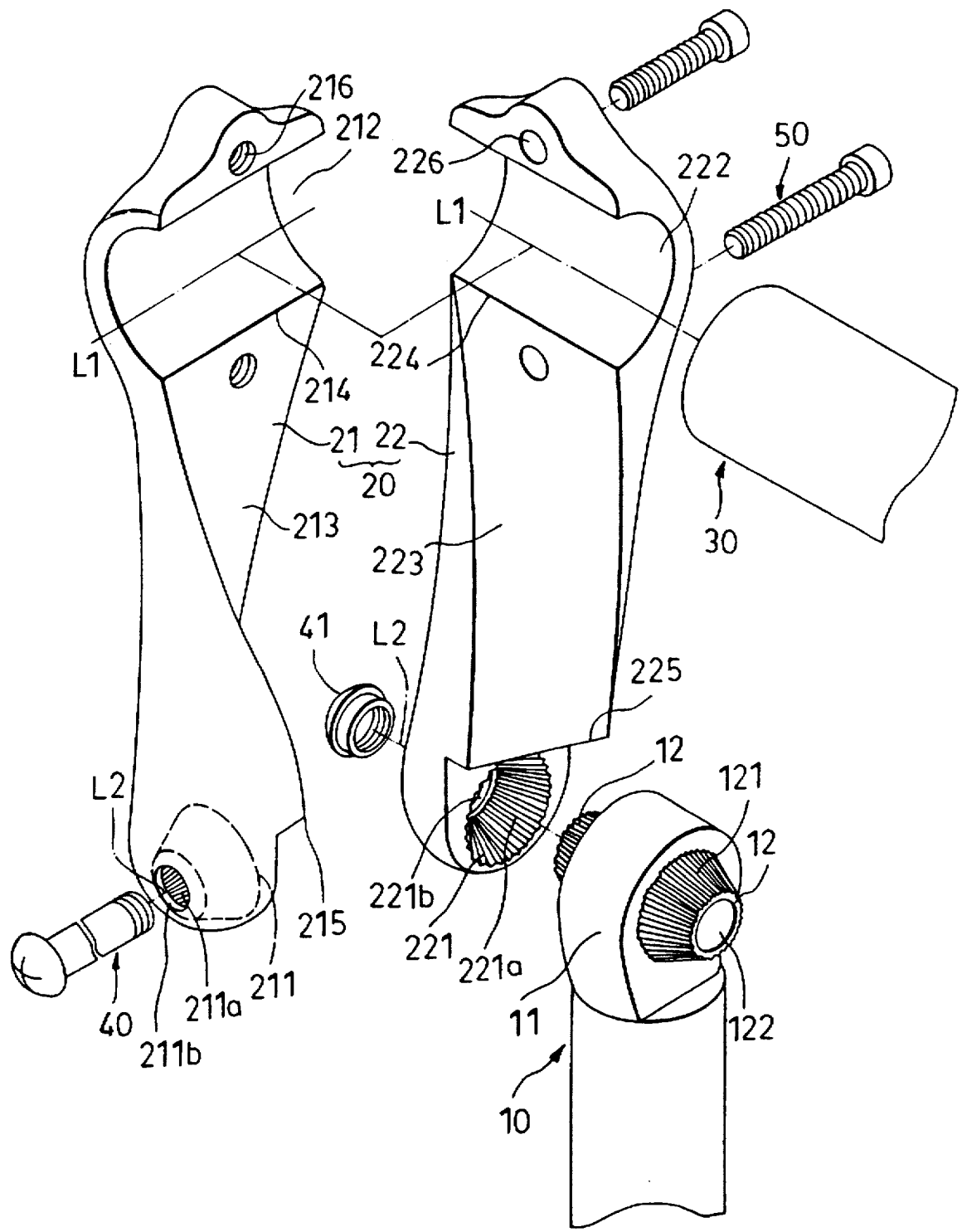
FIG. 2 is an exploded view of the preferred embodiment of a mounting device according to the present invention.
Figure 3:
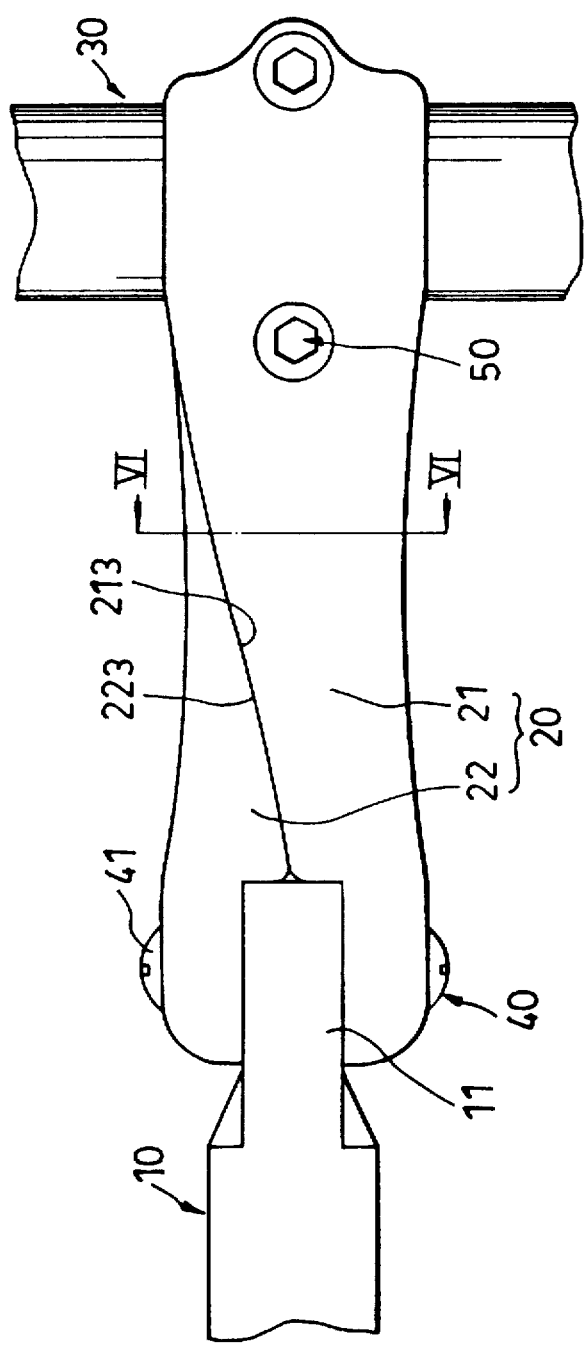
FIG. 3 is a top view of the preferred embodiment.
Figure 4:
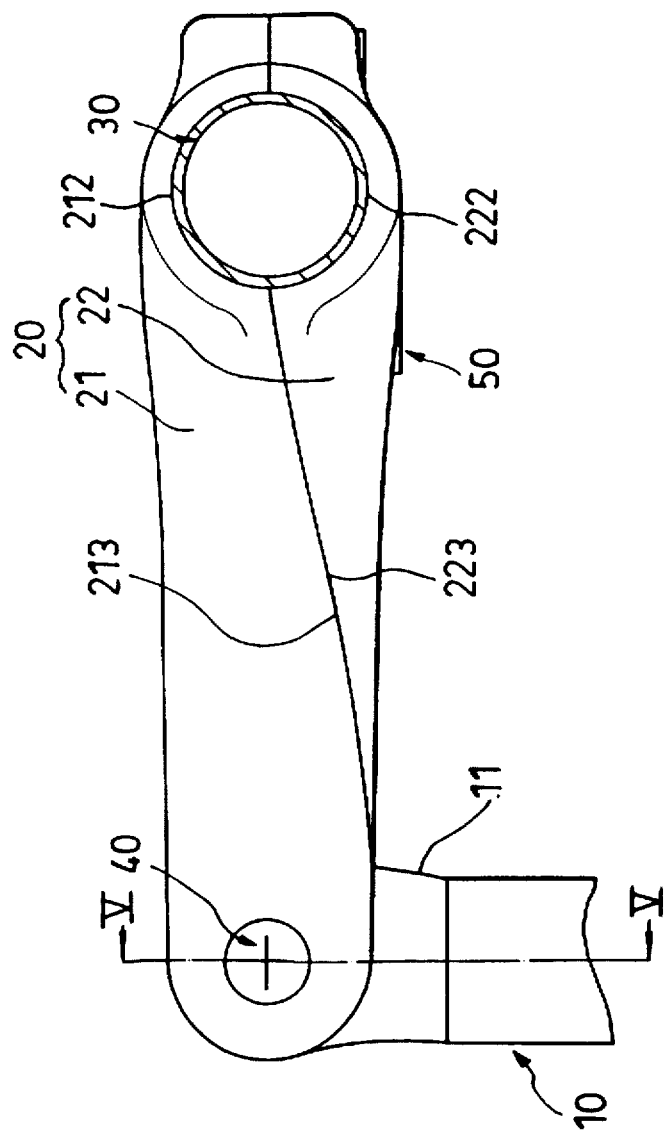
FIG. 4 is a side view of the preferred embodiment.
Figure 6:
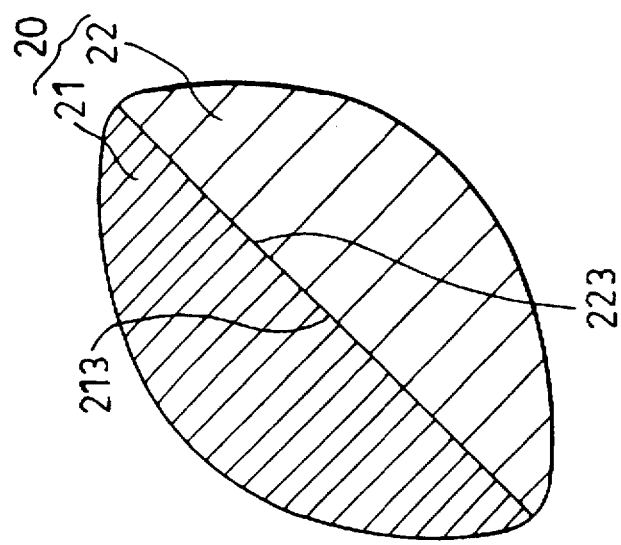
FIG. 6 is a sectional view of the preferred embodiment, taken along line VI—VI in FIG. 3.
Figure 5:
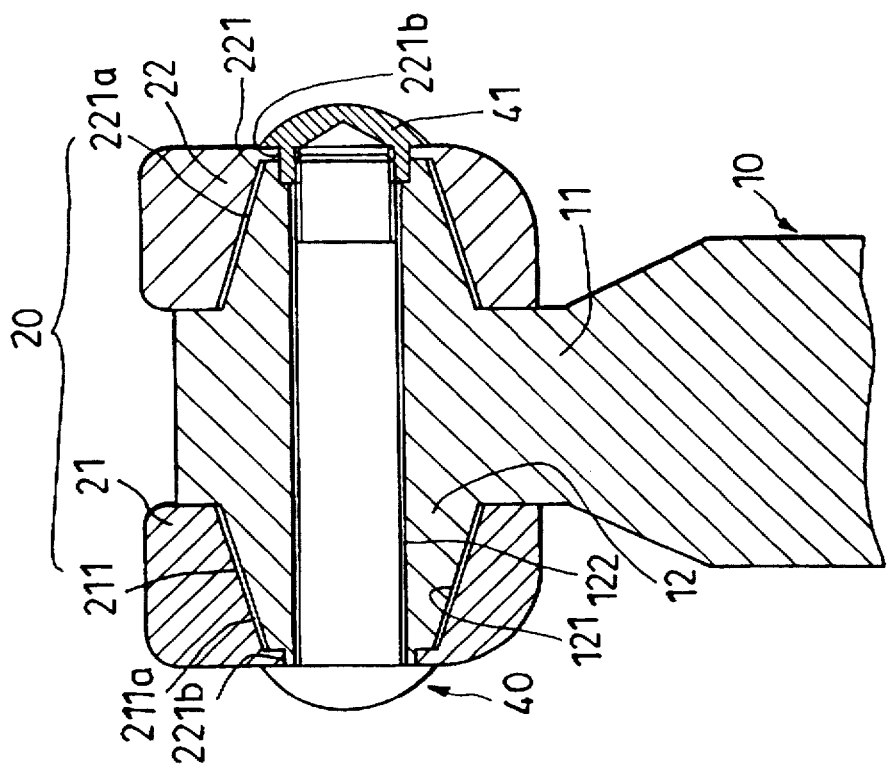
FIG. 5 is a sectional view of the preferred embodiment, taken along line V—V in FIG. 4.

Referring to FIG. 2, the preferred embodiment of a mounting device according to the present invention is shown to be used when mounting a handlebar 30 on a head tube 10 of a bicycle. The mounting device includes a positioning member 11, a holding member 20, a first fastener 40 and a pair of second fasteners 50.

The positioning member 11 is mounted integrally on a top end of the head tube 10 and is formed as a cylindrical block with an axis that is transverse to the head tube 10. The positioning member 11 has opposite flat faces, each of which is formed with a respective pivot projection 12. Each pivot projection 12 has an axis that is coaxial with that of the positioning member 11 and is shaped as a truncated cone, i.e. the diameter of the pivot projection 12 decreases in a direction away from the respective one of the flat faces of the positioning member 11. Each pivot projection 12 has a teethed outer surface 121. The positioning member 11 is further formed with a through-hole 122 that extends axially through the pivot projections 12.

3

The holding member 20 includes complementary first and second holding arms 21, 22. Each of the holding arms 21, 22 has a pivot end portion, a gripping end portion and an abutment face 213, 223 which extends between the pivot and gripping end portions.

The pivot end portion of each of the holding arms 21, 22 is formed with a pivot hole 211, 221 for receiving a respective one of the pivot projections 12 therein. Each pivot hole 211, 221 is formed with a teethed inner surface 211a, 221a for engaging the teethed outer surface 121 of the respective one of the pivot projections 12. Each pivot hole 211, 221 further has an open end 211b, 221b that is aligned with the through-hole 122 in the positioning member 11. The first fastener 40, such as a screw, extends through the pivot holes 211, 221 in the holding arms 21, 22 and the through-hole 122 in the positioning member 11, and engages a nut 41 to mount the holding member 20 onto the positioning member 11.

The gripping end portion of each of the holding arms 21, 22 is formed with a semi-circular grip section 212, 222. The axes L1 of the grip sections 212, 222 are parallel to the axes L2 of the pivot holes 211, 221. The grip sections 212, 222 are adapted to grip fittingly the handlebar 30 therebetween.

The abutment faces 213, 223 of the holding arms 21, 22 are complementary and are formed as twisted faces that abut against each other. Preferably, each abutment face 213, 223 has an edge 214, 224 adjacent to the gripping end portion which is transverse to an opposite edge 215, 225 that is adjacent to the pivot end portion.

The first holding arm 21 is formed with two threaded holes 216 that are disposed respectively on opposite sides of the grip section 212. The second holding arm 22 is formed with two mounting holes 226 that are aligned with the threaded holes 216 in the first holding arm 21. Thus, when the handlebar 30 is gripped by the grip sections 212, 222, the second fasteners 50 may be extended through the through-holes 226 so as to engage the threaded holes 216 in order to secure the holding member 20 on the handlebar 30.

Referring to FIGS. 3 to 6, during assembly, the pivot end portions of the holding arms 21, 22 are attached to the positioning member 11 by inserting the pivot projections 12 into the pivot holes 211, 221. At this time, the abutment faces 213, 223 of the holding arms 21, 22 abut against each other, and the teethed inner surface 211a, 221a of the pivot holes 211, 221 engage the teethed outer surface 121 of the pivot projections 12. When the handlebar 30 is positioned between the grip sections 212, 222 of the holding arms 21, 22, the first fastener 40 can be extended through the pivot holes 211, 221 in the holding arms 21, 22 and the through-hole 122 in the positioning member 11 so as to engage the nut 41, thereby mounting the holding member 20 securely on the positioning member 11. Engagement between the teethed inner surface 211a, 221a of the pivot holes 211, 221 and the teethed outer surface 121 of the pivot projections 12 guards against turning movement of the holding member 20 relative to the positioning member 11. When the second fasteners 50 are extended through the through-holes 226 in the second holding arm 22 so as to engage the threaded holes 216 in the first holding arm 21, the grip sections 212, 222 grip tightly the handlebar 30, thereby securing the holding member 20 on the handlebar 30.

When it is desired to adjust the height of the handlebar 30, the first and second fasteners 40, 50 are loosened to permit disengagement between the teethed inner surface 211a, 221a of the pivot holes 211, 221 and the teethed outer surface 121 of the pivot projections 12. At this time, the pivot end portions of the holding arms 21, 22 may be turned relative to the pivot projections 12 in order to vary the angle formed between the holding member 20 and the head tube 10 to adjust, in turn, the height of the handlebar 30. The first and second fasteners 40, 50 are tightened afterward to lock the handlebar 30 at the desired height.

When it is desired to rotate the handlebar 30 axially so as to adjust the inclination of handle portions (not shown) thereof, the second fasteners 50 are simply loosened to enable the grip sections 212, 222 to loosely grip the handlebar 30. The second fasteners 50 are tightened once the handlebar 30 has been rotated axially to the desired position.

The advantages and characterizing features of the mounting device of the present invention are as follows:

1. The mounting device of this invention has a simple structure which utilizes a relatively small number of components, thereby resulting in ease of installation of the mounting device and in a neat appearance.

2. When the first fastener 40 mounts the pivot end portions of the holding arms 21, 22 onto the positioning member 11, the forces that are transmitted to the pivot end portions are equally distributed on the abutment faces 213, 223. As such, no stretching force is generated between the holding arms 21, 22 to result in a connection that is both stable and easy to secure.

3. The various accessories on the handlebar 30, such as the brake handle, need not be removed when replacing the handlebar 30. When replacing the handlebar 30, the first fastener 40 is loosened slightly, and the second fasteners 50 are removed afterward. At this time, the holding arms 21, 22 can be turned in opposite directions so as to separate the grip sections 212, 222 to permit removal of the handlebar 30.

4. The pivot holes 211, 221 in the holding arms 21, 22 and the pivot projections 12 on the positioning member 11 are shaped as truncated cones to facilitate engagement therebetween.

Figure 7:
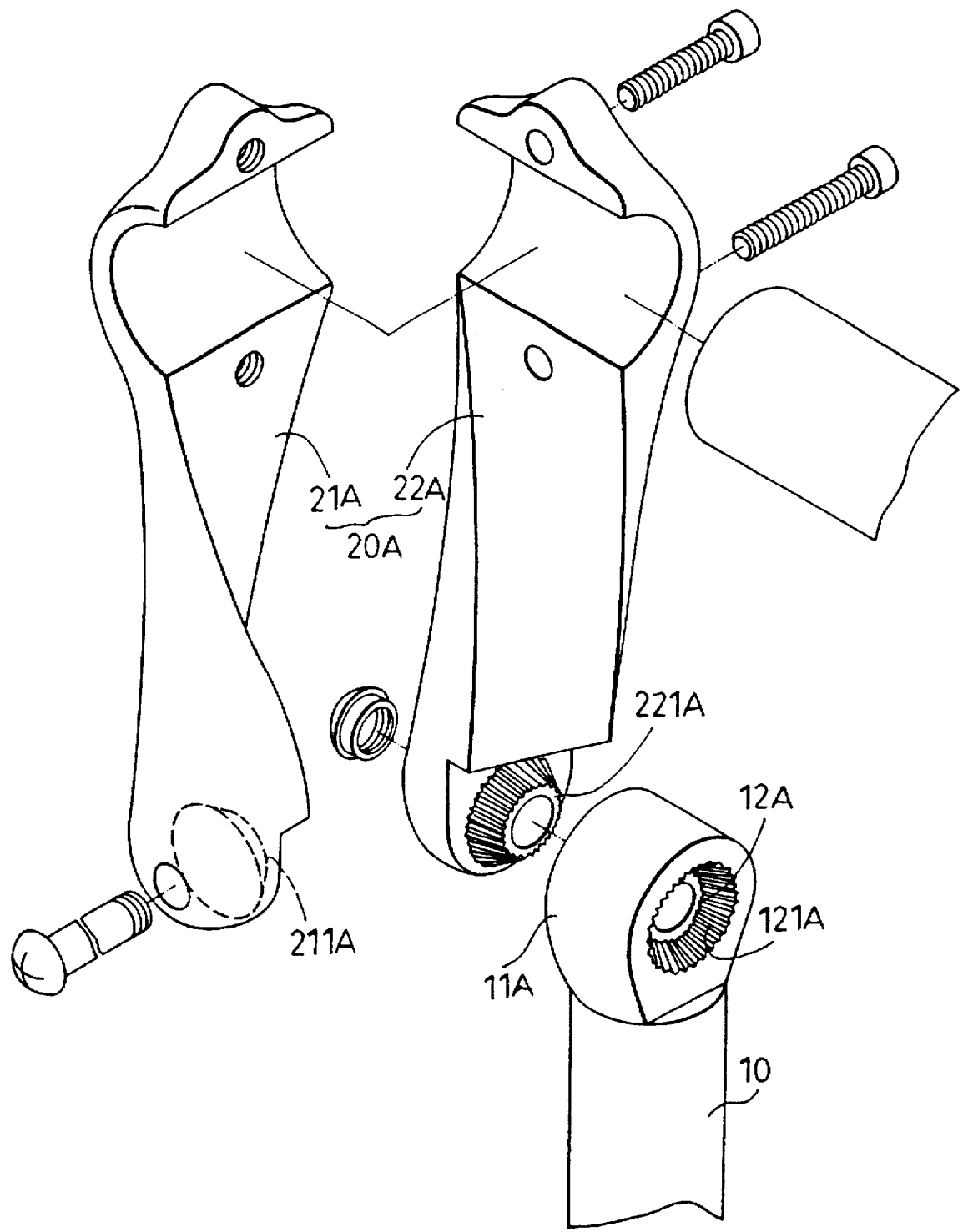
FIG. 7 is an exploded view of a modified embodiment of a mounting device according to the present invention.

FIG. 7 illustrates a modified embodiment of a mounting device according to the present invention. The modified embodiment is substantially similar to the previous embodiment except that, in this embodiment, each of the opposite flat faces of the positioning member 11A is formed with a pivot hole 12A that is shaped as a truncated cone and that has a teethed inner surface 121A, while the pivot end portion of each of the holding arms 21A, 22A of the holding member 20A is formed with a pivot projection 211A, 221A that is to be received in a respective one of the pivot holes 12A and that is formed with a teethed outer surface for engaging the teethed inner surface 121A of the respective one of the pivot holes 12A.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A mounting device for mounting a handlebar on a head tube of a bicycle, said mounting device comprising:

a positioning member adapted to be mounted on the head tube;

a holding member including complementary first and second holding arms, each of which has a pivot end portion, a gripping end portion and an abutment face which extends between said pivot and gripping end portions, one of said pivot end portion of each of said holding arms and said positioning member being formed with a pivot hole, the other one of said pivot end portion of each of said holding arms and said positioning member being formed with a pivot projection that is received in said pivot hole to mount pivotally said pivot end portion of each of said holding arms on said positioning member, said gripping end portion of each of said holding arms being formed with a grip section with an axis that is parallel to an axis of said pivot hole, said grip sections of said holding arms being adapted to grip fittingly the handlebar therebetween, said abutment faces of said holding arms being complementary and being formed as twisted faces that abut against each other;

a first fastener extending through said pivot end portion of each of said holding arms and said positioning member to mount said holding member onto said positioning member; and a second fastener extending through said holding arms on one side of said grip section to secure said holding member on the handlebar.

2. The mounting device as claimed in claim 1, wherein said pivot hole and said pivot projection are shaped as truncated cones.

3. The mounting device as claimed in claim 1, wherein said pivot hole has a teethed inner surface, and said pivot projection has a teethed outer surface for engaging said teethed inner surface of said pivot hole.

4. The mounting device as claimed in claim 1, wherein said grip section on said gripping end portion of each of said holding arms has a generally semi-circular cross-section.

5. The mounting device as claimed in claim 1, wherein said abutment face on each of said holding arms has an edge adjacent to said gripping end portion which is transverse to an opposite edge that is adjacent to said pivot end portion.

* * * * *